United States Patent [19]
Billings, Jr. et al.

[11] 4,042,294
[45] Aug. 16, 1977

[54] ILLUMINATED ELECTRO-OPTICAL DISPLAY APPARATUS

[75] Inventors: Lawrence A. Billings, Jr., Richardson; Daniel E. Evanicky, V. Joseph Hull, and Charles V. Ristagno, Dallas, all of Tex.

[73] Assignee: Micro-Display Systems, Inc., Dallas, Tex.

[22] Filed: Mar. 17, 1976

[21] Appl. No.: 667,484

[52] U.S. Cl. .............. 350/160 LC; 350/188; 428/337; 428/425; 428/523; 428/918
[51] Int. Cl.² .............................................. G02F 1/13
[58] Field of Search .......... 350/160 LC, 188; 428/337, 425, 523, 918

[56] References Cited
UNITED STATES PATENTS

| | | | |
|---|---|---|---|
| 3,840,695 | 10/1974 | Fischer | 350/160 LCX |
| 3,841,083 | 10/1974 | Bergey | 350/160 LCX |
| 3,864,905 | 2/1975 | Richardson | 350/160 LCX |
| 3,881,809 | 5/1975 | Fergason, et al | 350/160 LC |
| 3,994,564 | 11/1976 | Somogyi | 350/160 LC |

*Primary Examiner*—Edward S. Bauer
*Attorney, Agent or Firm*—Hubbard, Thurman, Turner & Tucker

[57] ABSTRACT

An improved illuminated electro-optical display system includes front and rear optically transmissive panels that are spaced apart in substantially parallel configuration. A liquid crystal composition occupies the space between the front and rear panels. Optically transmissive electrodes are disposed on the opposing surfaces of the front and rear panels. The electrodes are attached to suitable electrical leads whereby a voltage can be impressed between selected front and rear electrodes. A multi-cellular light diffusing panel is located behind the rear optically transmissive panel and a light source is located behind the multi-cellular light diffusing panel. Light from the light source is transmitted through the multi-cellular light diffusing panel, through the rear optically transmissive panel, through at least a portion of the liquid crystal composition and through at least a portion of the front optically transmissive panel. The light source can be a luminous radioactive panel or a light pipe plate disposed beneath the multi-cellular light diffusing panel with at least one light source adjacent an edge of the light pipe panel.

11 Claims, 2 Drawings

ILLUMINATED ELECTRO-OPTICAL DISPLAY APPARATUS

BACKGROUND OF THE INVENTION

An improved illuminated electro-optical display system includes front and rear optically transmissive panels that are spaced apart in substantially parallel configuration. A liquid crystal composition occupies the space between the front and rear panels. Optically transmissive electrodes are disposed on the opposing surfaces of the front and rear panels. The electrodes are attached to suitable electrical leads whereby a voltage can be impressed between selected front and rear electrodes. A multi-cellular light diffusing panel is located behind the rear optically transmissive panel and a light source is located behind the multi-cellular light diffusing panel. Light from the light source is transmitted through the multi-cellular light diffusing panel, through the rear optically transmissive panel, through at least a portion of the liquid crystal composition and through at least a portion of the front optically transmissive panel. The light source can be a luminous radioactive panel or a light pipe plate disposed beneath the multi-cellular light diffusing panel with at least one light source adjacent an edge of the light pipe panel.

This invention relates to an improved electro-optical liquid crystal display system. In another aspect, this invention relates to an improved illuminated electro-optical display system. In still another aspect, this invention relates to a method for illuminating liquid crystal display systems.

In recent years, there has been a considerable amount of research and development work in the area of electro-optical display devices and systems. As a result of such research and development work, electro-optical display devices utilizing liquid crystals are now being produced in large quantities. Because the electro-optical liquid crystal display system can be produced in small sizes and because they can be operated with very low energy requirements, they are particularly useful as display units for watches, clocks, and the like.

As the reliability of electronic components for use in wrist watches increases and as the cost of production of such components decrease, more and more liquid crystal display systems are being used in the manufacture of wrist watch time pieces.

The basic operations of liquid crystal display systems is known in the art. Briefly, liquid crystal display systems are normally made up of optically transmissive panels or plates with a liquid crystal composition sandwiched between the plates. Transparent conductive material is utilized to coat selected portions of the surfaces of the plates and suitable electrical leads are attached to the coatings to form electrodes on the surfaces of the parallel plates. The electrical leads are operably connected to a means to selectively impose a voltage between the electrodes.

Basically, there are two types of liquid crystal display devices in wide use at the present time. One of the types of devices is a "dynamic scattering" device wherein a liquid crystal composition is disposed between suitable plates containing electrodes. The thin layer of liquid crystal composition is essentially water-clear when no voltage is imposed across the composition. However, when a voltage is imposed across the thin layer of liquid crystal composition, the composition undergoes a non-destruction turbulence that results in a cloudy color to be imparted to the liquid crystal composition resulting from light scattering in the area of the non-destructive turbulence. Thus, by positioning a dark background behind the liquid crystal composition, light passing through the device will be absorbed by the dark background in the area of the clear portion of the liquid crystal composition while the area undergoing the non-destructive turbulence imparted by the voltage imposed across the composition, will show up as a light area because of the scattering of the light.

While dynamic scattering type liquid crystal devices have been widely used in such applications such as time piece display systems, they have certain deficiencies in that the boundaries between the clear portion of the liquid crystal composition and the cloudy areas are not always sharp and distinct. Additionally, such liquid crystal display devices, of course, depend on external light to provide the desired light scattering to make the devices "readable." Thus, when the ambient light conditions are relatively dark, the display systems are essentially useless.

Recently, several improvements have been made in the area of liquid crystal display systems to improve their efficiency and operability. Thus, a second major type of liquid crystal display system has been developed and is now finding wide use in such applications as display systems for watches. Briefly, the known improved liquid crystal display systems utilize the principle of twisted nematic liquid crystal compositions sandwiched between optically transmissive plates. The internal surfaces of the plates that contain the liquid crystal composition, with the electrodes affixed thereto, can be conveniently prepared by unidirectionally rubbing the surfaces thereof prior to fabrication of the device. By unidirectionally rubbing the internal surfaces of the plates, with the electrodes affixed thereto, and mounting the opposing plates with the axis of the rubbed surfaces being at right angles, the liquid crystal composition will align itself in a twisted path that twists through a 90° angle between the surfaces. Thus, light will be rotated in a 90° angle as it passes through the twisted nematic liquid crystal composition from one surface of the cell to the other surface. Application of an electric field between selected electrodes of the cell causes the twist of the nematic liquid crystal composition to be temporarily removed in the portion of the cell between the selected electrodes.

By mounting suitable optical polarizers on the cell walls, polarized light can be passed through the wall of the cell and the polarized light will be rotated as it passes through the twisted liquid crystal composition. In the above-mentioned known liquid crystal cell, where the surfaces of the cell have been unidirectionally rubbed and mounted at right angles to each other, the polarized light will be rotated 90° as it passes through the twisted liquid crystal composition. A second polarizer mounted on the other cell wall at 90° to the other will allow the polarized light beam to pass through the second polarizer and be reflected by a suitable reflector means mounted behind the liquid crystal cell. The polarized light will then be reflected back into the liquid crystal composition and will be twisted through 90° of rotation as it is transmitted back through the internal portion of the liquid crystal cell and will exit through the first optical polarizer.

When a voltage is imposed across the liquid crystal cell, light will not be rotated as it passes through the liquid crystal composition because the twisted orientation of the molecules of the composition has been temporarily removed. Thus, polarized light passing through an area where a voltage is imposed will not be rotated and when it reaches the second optical polarizer that is at right angles to the direction of polarization of the light and the light will not pass through the second light polarizer and will, of course, not be reflected back into the liquid crystal composition. Therefore, the area where the voltage is imposed will not reflect light and will show up as a dark area. It has been found that the degree of contrast observed in such a liquid crystal display device, using the above-mentioned optical polarizers and the twisted nematic liquid crystal composition is much greater than the degree of contrast that is observed using the older dynamic scattering type liquid crystal compositions.

While it is apparent that the newly developed liquid crystal display devices using optical polarizers and twisted nematic liquid crystal compositions are vastly superior to the dynamic scattering type liquid crystal display devices, they are still unacceptable when the ambient light conditions approach darkness.

It is, therefore, apparent that there is a need for an improved liquid crystal display system wherein the display system can be effectively utilized when ambient light conditions approach darkness.

SUMMARY OF THE INVENTION

Accordingly, it is an object of this invention to provide an improved electro-optical display system. It is another object of this invention to provide an improved electro-optical display system that is capable of being illuminated for use in ambient light conditions approaching darkness. It is still a further object of this invention to provide an improved method for illuminating electro-optical display systems.

Other aspects, objects and advantages of this invention will be apparent to those skilled in the art from the following description and appended claims.

In the instant invention, an electro-optical liquid crystal display system includes front and rear optically-transmissive panels that are spaced apart in substantially parallel configurations. Optically-transmissive electrodes are disposed on the opposing surfaces of the front and rear optically-transmissive panels. Suitable means for imposing a voltage across selected front and rear electrodes are provided. The opposing surfaces of the front and rear panels are treated by suitable means to orient the surfaces thereof to impart a twist to a nematic liquid crystal composition that occupies the space between the front and rear panels. Optical polarizers are located on the front and rear panels of the display device. The optical polarizers can be oriented in any known configuration with respect to each other and/or respect to the internal surfaces of the panels. In one preferred embodiment, the direction of polarization of the front polarizer is substantially parallel to the direction of orientation of the internal surface of the front panel such that light entering the front panel will be polarized in a predetermined direction and the polarized light will be twisted as it passes through the liquid crystal composition. An optical polarizer is affixed to the rear plate with the direction of polarization being substantially parallel to the direction of orientation of the internal surface of the rear panel such that polarized light exiting from the cell will pass through said rear polarizer. A multicellular light diffusing panel is located behind the rear optically-transmissive panel and a light source is located behind the multi-cellular light diffusing panel. Light from the light source is transmitted through the multi-cellular light diffusing panel, through the rear optically-transmissive panel, through at least a portion of the liquid crystal composition and through at least a portion of the front optically-transmissive panel. The light source can be a luminous panel or a light pipe plate disposed behind the multi-cellular light diffusing panel with at least one light source adjacent an edge of the light pipe panel. The surface of the multi-cellular light diffusing panel will have sufficient light reflecting properties so that light will readily be reflected under normal daylight conditions, thereby allowing the optical display device to be used without activation of the light source under normal daylight conditions.

DESCRIPTION OF PREFERRED EMBODIMENTS

Figure 1:
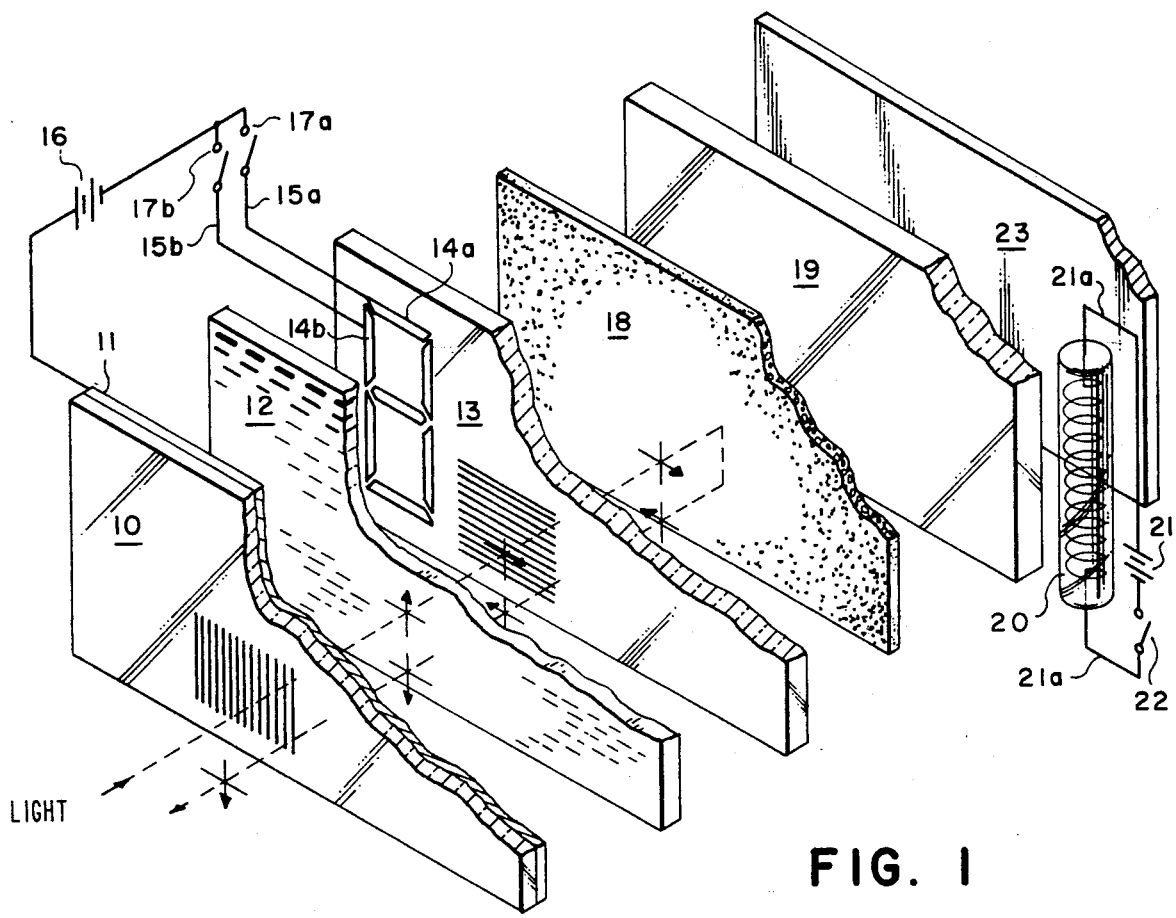
FIG. 1 is an exploded perspective view of one of the preferred embodiments of this invention showing the arrangement of various elements of a self-illuminating liquid crystal display device.

The preferred embodiments of the present invention can best be described by referring to the drawings. For purposes of clarity, FIG. 1 is an exploded view of components used to fabricate one of the preferred embodiments of this invention. As shown in FIG. 1, an improved electro-optical liquid crystal display device is made up of several elements, including an optically transmissive front panel 10 having an optically-transmissive and at least partially electrically-conductive front electrode 11. The term, "optically-transmissive," as used throughout this specification, includes both totally transparent and translucent materials. Optically-transmissive panel 10 can be made of any suitable material which is optically-transmissive, including various types of glass, transparent plastics or resins, fused quartz and the like. Optically-transmissive and electrically conductive coating 11, which serves as the front electrode for the liquid crystal cell, may be composed of layers of various types of metallic oxides, such as indium oxide or tin oxide that have been deposited on the surface of front panel 10 by means well known in the art. Optically-transmissive front panel 10 also includes a polarizer to polarize light entering the liquid crystal cell under ambient conditions. The operation of the polarizer will be more fully described hereinafter.

Nematic liquid crystal composition 12 is sandwiched between front panel 10, with the affixed front electrode 11, and optically-transmissive back panel 13. Back panel 13 can be made of the same general types of material as front panel 10. Disposed on the surface of back panel 13 are electrodes which are optically transmissive and electrically conductive. As widely used in liquid crystal display systems, such as used in wrist watches, a seven-bar segment of electrodes can be disposed on back panel 13 by known means. For purposes of illustration, only two of the electrodes are shown as being affixed to suitable electrical leads in FIG. 1. Thus, electrodes 14a and 14b are illustrated as being attached to electrode leads 15a and 15b. A voltage can be thus impressed across liquid crystal composition 12 by means of electrical source 16, which can be a small battery, by closing switches 17a and/or 17b. When the liquid crystal cell is used in a conventional wrist watch, the voltage can be impressed across selected electrodes in response to signals generated by the integrated circuit chassis of the watch. It will, of course, be appreciated that either the front panel 10 or the back panel 13 can contain the segmented and/or electrodes, so long as sufficient electrode material is present to allow for selective electrical potential to be imposed across the liquid crystal material contained between the panels.

The opposing surfaces of the front panel 10, with front electrode 11 affixed thereto and back panel 13 with back electrodes 14 affixed thereto, are treated by known methods such as unidirectional stroking or rubbing to produce a type of orientation whereby the liquid crystal composition sandwiched therebetween, causes the molecular axes of the liquid crystal material to align parallel to the surface of the plates and along the rubbing direction. Preferably, the axes of rubbing or orientation will be at right angles between the front and back electrode surfaces. For example, in FIG. 1, the direction of rubbing will be in a vertical direction with the direction of rubbing along the back panel being in a horizontal direction. When the liquid crystal display devices include optical polarizers and the oriented internal surfaces as illustrated in FIG. 1, the direction of orientation of the front polarizer on the surface of front panel 10 will be substantially parallel to the direction of orientation on the internal surface of the panel and the direction of polarization of the rear polarizer on the surface of rear panel 13 will be substantially parallel to the direction of orientation of the internal surface of the panel.

When a nematic liquid crystal composition is sandwiched between front panel 10 and back panel 13 that have been previously rubbed or otherwise oriented in such unidirectional directions, and mounted as illustrated, the molecules of the nematic crystal will align themselves in a twisted configuration so that the molecules of the liquid crystal go through a twist of 90° between the surfaces when no voltage is impressed between the front and back plates. Application of an electrical field across the liquid crystal composition will cause the twist to be temporarily removed as a result of molecular orientation. Thus, when light enters the liquid crystal display device as illustrated by the dashed line in FIG. 1, it will be polarized into a vertical direction by virtue of the vertical polarizer incorporated into front panel 10 and as it passes through the twisted nematic liquid crystal composition, it will be rotated to a horizontal direction as it reaches back panel 13. If desired, a horizontal polarizer can also be incorporated into back panel 13. A suitable reflective surface, which will be more fully described later, is positioned behind back panel 13 which will reflect the polarized light back into the liquid crystal with the sense of rotation reversed by the reflecting member. As the light passes back through liquid crystal composition 12, it will be again rotated 90° and will exit the front panel through the front polarizer and will be polarized in a vertical direction.

When a voltage is impressed across liquid crystal composition 12, the molecular orientation of liquid crystal composition 12 will be temporarily removed and light will not undergo the twist as it passes through liquid crystal composition 12. As a result, it will not be polarized in a horizontal direction when it reaches back panel 13 with the horizontal polarizer disposed therein. Thus, the light will be blocked and will not pass through the horizontal polarizer incorporated into back panel 13. Therefore, no light will be reflected back through rear panel 13 and there will be no light transmitted back through liquid crystal composition 12 or through front panel 10 and the area will appear as a dark area when viewed from the front. As a result, high contrast visual displays are obtained when electrical fields are imposed on selected portions of the liquid crystal display device.

It will be appreciated that the foregoing brief description of a portion of FIG. 1 has been a discussion of known liquid crystal display systems utilizing the twisted nematic field effect liquid crystal compositions with polarizers that produces a high contrast electro-optical display in ambient near daylight conditions. It will also be appreciated that by virtue of the incorporation of the light polarizers in front panel 10 and rear panel 13 that at least 50% of the light entering the liquid crystal is not reflected and that in ambient light conditions approaching darkness, that the liquid crystal electro-optical display device is very difficult to read. Thus, the instant invention solves the problems connected with the abovementioned known liquid crystal electro-optical display apparatus by utilizing a light diffusing panel 18 which is positioned immediately behind back panel 13. The surface of light diffusing panel 18 immediately adjacent back panel 13 is at least partially light reflecting in order that light entering the liquid crystal display apparatus under ambient near daylight conditions can be reflected as described above. It will be appreciated that light diffusing panel 18 cannot be completely diffusing because a complete diffusing surface would de-polarize incoming ambient light and would reduce the contrast and overall brightness of the liquid crystal display device when the device is utilized under ambient daylight conditions. On the other hand, it is not desirable to have the surface of light diffusing panel 18 that is adjacent back panel 13 completely specular because the completely specular device tends to create a double-imaging of the display device, as well as causing a glare when the device is viewed from certain angles. Therefore, as mentioned above, it is desirable that the surface of light diffusing panel 18 that is adjacent back panel 13 be at least partially light reflective.

Light diffusing panel 18 is a multi-cellular light diffusing panel with the front surface of illuminating means 19 adjacent the back side thereof. Light diffusing panel 18 is of multi-cellular construction such that light from illuminating means 19 passes through light diffusing panel 18 and will be uniformly distributed over the front surface of the light diffusing panel. Since the front surface of light diffusing panel 18 is adjacent rear light transmissive panel 13, light will be uniformly distributed across at least a portion thereof and will enter the liquid crystal cell through back panel 13 and will pass through liquid crystal composition 12 and will exit the liquid crystal display device through front panel 10. The light from illuminating means 19 that passes through light diffusing panel 18 and enters the display device through back panel 13 will be polarized by the optical polarizer incorporated into back panel 13. Because of the twisted nematic liquid crystal composition sandwiched between the front and back panels, the polarized light will be rotated as it passes through the liquid crystal composition and will exit the display device through front panel 10 and through the optical polarizer disposed therein. When light entering the liquid crystal display apparatus from illuminating means 19 by passage through light diffusing panel 18 passes through an area of the liquid crystal composition wherein a voltage is impressed, the light will not undergo the rotation as it passes through the liquid crystal composition and will not pass through the polarizer in front panel 10. Thus, the illustrated device will illuminate the liquid crystal display by passage of the light from illuminating means 19 through light diffusing panel 18, through back panel 13, through liquid crystal composition 12 and through front panel 10, only in those areas where there is no electrical field imposed.

Light diffusing panel 18 can be fabricated from many types of multi-cellular materials. It has been found that foamed materials such as sheets of foamed thermoplastic are particularly useful for fabricating light diffusing panel 18. In order to produce a display device having good contrast and optical properties, it has been found that light diffusing panel 18 should have a multi-cellular structure with sufficient light transmissive properties to allow light leakage or passage from illuminating means 19 evenly through light diffusing panel 18 with uniform diffusion of light across its entire surface adjacent rear panel 13. Thus, when the surface of multi-cellular material is too smooth with an extremely dense cell structure, it will not provide sufficient light leakage while too rough a surface with very large open cell structure tends to give a point light source effect. Of course, the material must be sufficiently transparent to allow the light to pass through and illuminate the device, but the material should not be transparent because the surface of light diffusing panel 18 serves to reflect light when the device is used under ambient near daylight conditions.

When the liquid crystal display devices of this invention are used as display devices for watches and the like, there is, of course, a restriction on the thickness of the light diffusing panel. It has been found that thicknesses of from about 0.001 to about 0.01 inch are quite effective. The cell density of the multi-cellular thermoplastic materials should be sufficiently great that the cells themselves are not obtrusive to the naked eye under ordinary viewing conditions. It has been found that thermoplastic materials having cell size dimensions (void space sizes) of from about 0.0015 to about 0.01 inch are highly effective as light diffusing panels. Materials such as foamed polystyrene sheets, foamed polypropylene sheets, foamed polyurethane sheets and the like, are especially suitable in this invention. The thermoplastic materials can be foamed to produce the multi-cellular construction by any means known in the art such as by polymerizing the appropriate monomer and blending the polymer with suitable blowing agents and nucleating agents and thereafter extruding the material through a blown film die, by polymerizing the monomer with blowing and nucleating agents followed by blowing and the like. Various methods for producing multi-cellular materials are readily available in the art and do not constitute a part of this invention.

Illuminating means 19 can be any suitable means that will spread light across the entire surface of light diffusing panel 18 in a uniform manner. Thus, illuminating means 19 can be well known radioactive luminescent panels that require no external power to create the luminescence or more conventional illuminating devices such as electro-luminescent panels that require external power. One particularly preferred illuminating means useful in this invention is a "self-luminous" light source commonly known as a "beta light." Thus, a sealed flattened glass or plastic tube containing tritium gas and a phosphor will function quite well for illuminating means 19. Phosphor coated sealed flat panels containing radioactive components can also be used as illuminating means 19. Another particularly applicable type of illuminating means in the instant invention is a light pipe panel that utilizes a light source such as an incandescent light bulb.

As illustrated in the drawings, illuminating means 19 can be a light pipe such as a substantially flat panel of glass or transparent resinous material such as polystyrene, an acrylic type material such as Lucite (a trademark of E. I. duPont de Nemours Company) or Plexi-Glass (a trademark of Rhom & Haas Co.) or any other suitable material that will transmit light from one point to another. A light source such as a small, incandescent light bulb 20 can be disposed along the edge of the light pipe panel to supply the necessary illumination. Of course, when a light source such as incandescent light bulb 20 is utilized, it will be necessary to connect bulb 20 to a suitable power source such as battery 21 by means of electrical leads 21a. Since the illustrated liquid crystal display device will be used under ambient light conditions as well as under dark conditions, it is highly desirable to incorporate suitable switch 22 into electrical leads 21a leading to incandescent light bulb 20 so that the electric lamp will be illuminated only when desired. By using switch 22, which can be conveniently mounted on the case of a wrist watch, the lifetime of battery 21 will be materially increased since there will be a power drain on battery 21 only when the device is activated under ambient non-daylight conditions.

Preferably, illuminating means 19, such as the illustrated light pipe, will be placed in contact with the back surface of light diffusing panel 18. If desired, multi-cellular light diffusing panel 18 can be bonded to the surface of illuminating means 19 by suitable cement or light diffusing panel 18 can be foamed in place on the surface of illuminating means 19 by any means known in the art. In some instances, it may be desirable to roughen or texturize the surface of illuminating means 19 when it is a light pipe to increase the amount of light transmitted from light pipe 19 into the rear surface of multi-cellular light diffusing means 18.

It will be appreciated that when a light pipe is utilized as illuminating means 19, that it may be desirable to have a plurality of light sources such as incandescent light bulbs 20 placed around the various edges of the light pipe. As light from incandescent light bulb 20 passes into the internal portion of light pipe 19, it is uniformly spread throughout the light pipe and will illuminate the back portion of light diffusing panel 18. Since light diffusing panel 18 is partially optically transmissive, the light will thus be passed through the liquid crystal display device, as mentioned above.

If desired, a suitable reflector panel 23 can be positioned behind illuminating means 19 to increase the efficiency of the transmission of light through the liquid crystal display device. Reflector panel 23 can be a mirror surface, or it can be of the same material that light diffusing panel 18 is constructed of. Additionally, it may be desirable to place reflector means around the periphery of illuminating means 19 when such means is a light pipe, as illustrated in FIG. 1, in order to increase the amount of light that is ultimately passed from the light pipe through light diffusing panel 18.

When a radioactive illuminating means, such as a sealed glass flattened tube containing tritium and a phosphor, is used in the fabrication of the display means of this invention, it will, of course, be understood that the above-mentioned light pipe and incandescent light source will not be needed. Likewise, back reflector panel 23 can also be deleted.

Figure 2:
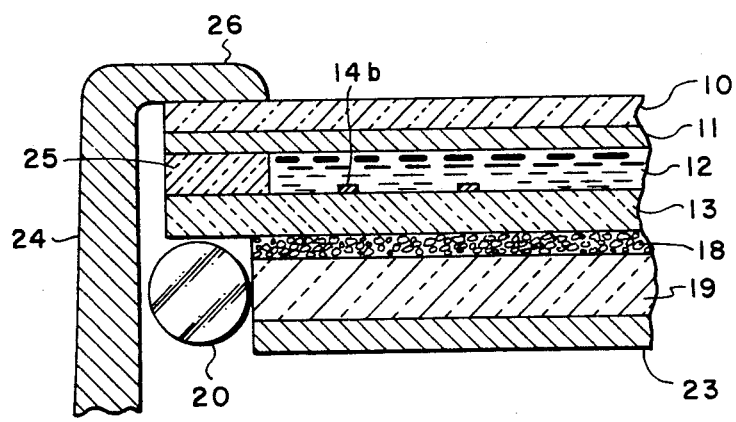
FIG. 2 is a cross-sectional view of a portion of one of the preferred embodiments of this invention illustrating the mounting of the liquid crystal display device in a wrist watch case.

FIG. 2 has been included to illustrate one preferred method for fabricating the electro-optical liquid crystal display device of this invention into a wrist watch. FIG. 2 is a cross-sectional area of a portion of a wrist watch showing wrist watch case 24 with the electro-optical display device therein. As shown in FIG. 2, the various elements of the liquid crystal display device are held in the watch case by means of a lip or flange 26 with incandescent light bulb 20 being positioned below and slightly to one side of the display device such that light from incandescent light bulb 20 enters light pipe 19 from the side so that it may be evenly transmitted throughout light pipe 19 and ultimately reflected into light diffusing panel 18.

It will be apparent to those skilled in the art that various changes and modifications may be made in the foregoing description without departing from the spirit and scope of this invention.

We claim:

1. In an electro-optical display apparatus having front and rear optically-transmissive panels for viewing from the front, said front and rear optically-transmissive panels being in spaced-apart relationship with a liquid crystal composition occupying the space therebetween and with means to impress a voltage between selected portions of said front and rear optically-transmissive panels, the improvements comprising:
   (a) an illuminating means having a front surface and a rear surface positioned behind said rear optically-transmissive panel with the front surface of said illuminating means being adjacent the rear optically-transmissive panel, said illuminating means being adapted to uniformly distribute light across the front surface of said illuminating means; and
   (b) a multi-cellular light diffusing panel intermediate said rear optically-transmissive panel and said front surface of said illuminating means, said light diffusing panel being adapted to diffuse and uniformly distribute light across at least a portion of said rear optically-transmissive panel.

2. The apparatus of claim 1 wherein said light diffusing panel is a foamed thermoplastic material.

3. The apparatus of claim 2 wherein said sheet of thermoplastic material has a thickness of from about 0.001 inch to about 0.01 inch.

4. The apparatus of claim 3 wherein the cell size of cells in said sheet of thermoplastic material is from about 0.001 inch to about 0.01 inch.

5. The apparatus of claim 1 wherein said illuminating means is a light pipe with a light source being positioned adjacent at least a portion of said light pipe.

6. The apparatus of claim 5 wherein a light reflecting means is disposed adjacent the rear surface of said illuminating means.

7. The apparatus of claim 6 wherein said light source is an incandescent light bulb.

8. The apparatus of claim 7, including a switching means operably connected to said light bulb.

9. The apparatus of claim 1 wherein said illuminating means is a luminous radioactive panel.

10. The apparatus of claim 9 wherein said luminous radioactive panel comprises a flattened glass tube containing tritium and a phosphor.

11. A method of illuminating an electro-optical display apparatus having front and rear optically-transmissive panels with a liquid crystal disposed therebetween and means to impress a voltage between selected portions of said front and rear optically-transmissive panels which comprises passing light through a multi-cellular light diffusing means positioned such that light is evenly distributed by said multi-cellular light diffusing means and enters at least a portion of the rear optically-transmissive panel and is transmitted through at least a portion of said liquid crystal composition and exits through said front optically-transmissive panel.

* * * * *